United States Patent [19]

Wakui et al.

[11] Patent Number: 4,669,307

[45] Date of Patent: Jun. 2, 1987

[54] MILK AMOUNT MEASURING DEVICE FOR MILKING MACHINES AND THE METHOD FOR MEASURING THE SAME

[75] Inventors: Akio Wakui; Masahiro Usuda; Naotake Nishizawa, all of Suzaka, Japan

[73] Assignee: Orion Kikai Kabushiki Kaisha, Nagano, Japan

[21] Appl. No.: 700,766

[22] PCT Filed: May 8, 1984

[86] PCT No.: PCT/JP84/00231

§ 371 Date: Jan. 10, 1985

§ 102(e) Date: Jan. 10, 1985

[87] PCT Pub. No.: WO84/04588

PCT Pub. Date: Nov. 22, 1984

[30] Foreign Application Priority Data

May 11, 1983 [JP] Japan ................................. 58-82149
Nov. 16, 1983 [JP] Japan ................................. 58-215831

[51] Int. Cl.⁴ ......................... G01F 3/26; G01G 17/04
[52] U.S. Cl. .................................... 73/223; 119/14.17; 177/115
[58] Field of Search ................. 73/223, 198, 200, 219; 119/14.17, 14.05, 14.06, 14.08, 14.46; 177/24, 115

[56] References Cited

U.S. PATENT DOCUMENTS

| 1,351,284 | 8/1920 | Cawsey | 177/115 |
| 1,364,003 | 12/1920 | Smith | 177/115 |
| 3,705,533 | 12/1972 | Kahl et al. | 73/171 |
| 4,030,356 | 6/1977 | Jaquith | 73/219 X |
| 4,513,830 | 4/1985 | Persbeck et al. | 73/223 X |

FOREIGN PATENT DOCUMENTS

1227252 10/1966 Fed. Rep. of Germany ........ 73/223

Primary Examiner—Charles A. Ruehl
Attorney, Agent, or Firm—Toren, McGeady & Associates

[57] ABSTRACT

A device which measures the amount of milk which has been milked by a combination of a swinging member 2 and a tank 5; and a weight balance section, thereby enhancing accuracy in measurement as well as reducing in size the device. A measuring method for total milk amount by using the measuring device and by measuring the amount of milk which is filled in the tank 5 and the amount of milk which does not flow into the tank 5 at the time of discharging with the rotational cycles of the swinging member 2 to thereby achieve a higher precision.

11 Claims, 17 Drawing Figures

MILK AMOUNT MEASURING DEVICE FOR MILKING MACHINES AND THE METHOD FOR MEASURING THE SAME

FIELD OF THE INVENTION

The present invention relates to a device for measuring the total quantity milked by a machine and more particularly, to a milk measuring device for milking machines comprising a measuring means which repeats rotating movements in the vertical direction corresponding to the flow rate of milk. The present invention further relates to a measuring method of total milk quantity which has been milked.

BACKGROUND OF THE INVENTION

Figure 1:
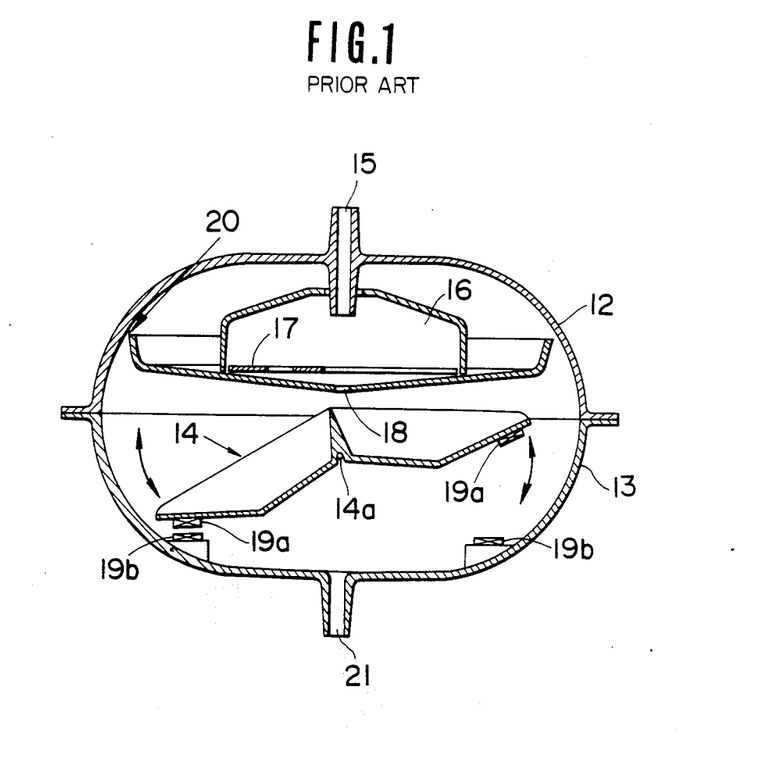
FIG. 1 is a cross section of a prior art milk measuring device.

FIG. 1 shows a prior art milk measuring device (U.S. Pat. No. 2,998,722) Within containers 12, 13 are housed a separating chamber 16 for separating milk from the mixture of milk and air which has been milked from a cow and a measuring means 14 which is positioned beneath the separating chamber 16 and which repeats vertically revolving movements in correspondence to the flow rate. The milk mixture extracted by a milking machine is guided into an inlet port 15 provided on the top of the container 12 via a milk tube (not shown) and then into the separating chamber 16. The mixture of milk and air which has been directed into the separating chamber 16 is reduced in inlet energy by a rectifying plate 17 and the milk is directed to flow into the measuring means 14 through an outlet port 18 provided on the bottom of the separating chamber 16. The air separated from the milk passes through a narrow space 20 provided between the container 12 and the chamber 16 to arrive at an outlet port 21 on the bottom of the container 13, rejoins the milk which has passed through the measuring means 14 and is finally guided into a milk supply tube (not shown). The measuring device 14 comprises two tanks to temporarily store the milk which are journaled rotatively on an axis 14a fixed on the container 13. The measuring device 14 further comprises permanent magnets 19a on the bottoms of respective tanks. Magnets 19b are provided on the container 13 to correspond to the magnets 19a. When milk flows and stands in a tank in an amount which sufficiently overcomes the magnetic attraction between the magnet 19a of the other tank and the magnet 19b corresponding thereto, the weight equilibrium between two sides of the axis 14a breaks, to thereby lower the tank containing the milk around the axis 14a to the extent where the magnet thereof is attracted and attached to the other corresponding magnet. That makes the standing milk to flow out of the tank and meanwhile, the milk which is being milked continuously flows in to the other tank of the measuring means 14.

The total amount of milk can be measured by detecting the number of movements of the measuring means 14 which repeats the above mentioned movements and multiplying the number by the amount of milk which is to be discharged by one movement of the means 14.

The prior art device mentioned above, however, is detrimental in the following aspects:

As the measuring means 14 is structured with two tanks and as the position of the means 14 must be retained while milk is being filled in one of the tanks, the other tank must have a given retaining force which counter-balances the predetermined amount of milk in the first tank. In order to give such a retaining force, the suction of magnets is utilized. However, the magnetic force of magnets varies widely. Moreover, as the magnetic force changes suddenly in a manner counter-proportionate to the square of distance, it is necessary to mount a special mechanism for adjusting the magnetic force on the device so as to cause a pair of magnets to generate a predetermined suction force, presenting difficulties in cost and size of the prior art device.

As the magnetic force of a magnet undergoes chronological changes by various factors, it is extremely difficult to maintain the predetermined precision thereof for a long term without proper maintenance service. Even with periodical maintenance service, it is still difficult for users to adjust the device to the predetermined precision.

As the means 14 has two tanks, the size of the device per se becomes inevitably bulky presenting trouble in transportation while milking.

Figure 11:
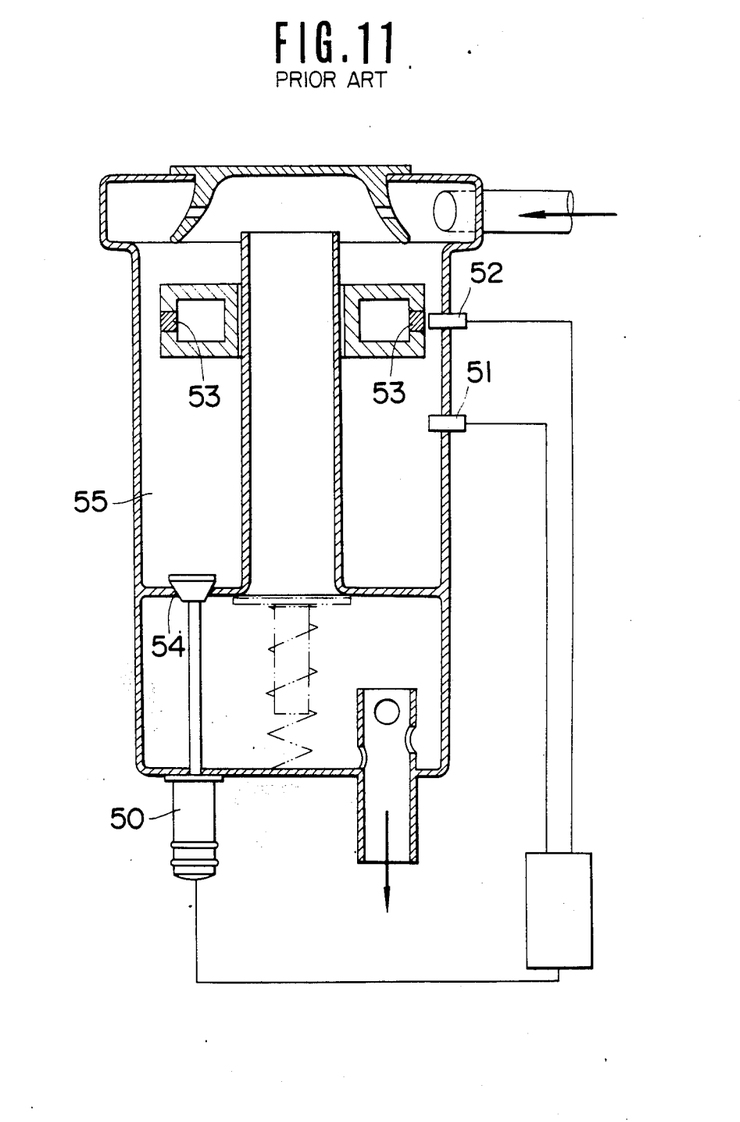
FIG. 11 is a cross section of a milk measuring device.
Figure 12:
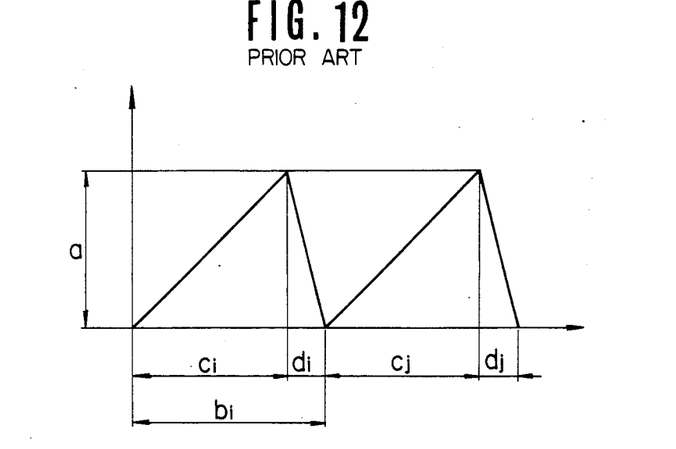
FIG. 12 a graph to show the relation between the height of liquid level and the time.

Another prior art measuring device as shown in FIGS. 11 and 12 has been known; wherein the filling time of milk into a measuring container and the discharging time thereof are measured (JAP Laid-Open No. Sho 57-18926). When a measuring chamber 55 is being filled with a valve 50 closed, the time Ci required for a float 53 to move from the lower magnetic sensor 51 to the upper magnetic sensor 52 is measured by the above two sensors. Within that time period, the volume V is filled in the chamber 55. After the float 53 has reached the sensor 52, a milk outlet port 54 is opened via the valve 50 and the float 53 goes down to the sensor 51 within the time di. Then, the valve 50 is closed and the float goes up again. $\overline{Q}i$ represents the average partial flow rate and is expressed by the equation, $$\overline{Q}i = (V/ci).$$

If it is assumed that the flow comes in within the time di at a predetermined average partial flow rate, the volume Vi which flows in within the time, bi=ci+di can be expressed as below;

$$Vi = \overline{Q}i \times x\ bi = (bi/ci) \times V$$

The total amount of the extracted milk which is measured by n times can be obtained from the equation;

$$Q \approx \sum_{i=1}^{n} V_i = V \times \sum_{i=1}^{n} \frac{bi}{ci}$$

The prior art measuring method, however, is defective in that, as it is assumed that the milk which flows in within the time required for the liquid level to move from the upper sensor 52 to the lower sensor 51 supposedly flows at the average partial flow rate Qi of the filling time ci. In actual milking operation, the partial flow rate in the filling time does not necessarily coincide with the partial flow rate in the discharging time and therefore, a high precision in measuring can not be expected.

DISCLOSURE OF THE INVENTION

In order to obviate the aforementioned defects in prior art, this invention aims at providing a device for measuring milk for milking machines which is compact in size and simple in maintenance. The device comprises a swinging member 2 which comprises a balance member 3 having a weight on one side and a milk tank 5 on the other side which is open at the upper portion, a shaft 1 which supports said swinging member 2 in a manner vertically rotatable, a stop means 8 provided near the swinging member 2 to restrict the scope of rotational movement thereof, and a sensor means 9 which detects the rotational cycles of said swinging member 2.

As the measuring means has now only one tank instead of two tanks, maintenance operation is unnecessary for quite a long period of time and yet the desired precision can be maintained. This invention can therefore provide a device smaller in size and lower in cost compared with prior art milk measuring device.

This invention also provides a measuring method for milk quantity in order to improve the measuring precision. In the measuring method which measures the total milk amount wherein extracted milk flows in and stands in a tank temporarily for a certain period of time and then flows out, and this operation is repeated consecutively, the measuring method comprises the steps of measuring partial milk amounts $Y_i$ (g/cycle) which corresponds to respective cycles $T_i$ from the beginning of filling until the completion of discharge and preparing a partial milk amount cycle curve, measuring respective cycles of filling and discharging of milk in or out of the tank from the beginning till the end of the milking operation, and obtaining the sum of partial milk amounts corresponding to each cycle. The method according to this invention also comprises steps of measuring two average partial flow rates $q_i$ and $q_{i+1}$ each at two different time points in filling cycles immediately before and after the discharge, measuring a filling time $t_i$ and a discharging time $s_i$, and calculating the total sum of the products of the arithmetric mean partial flow rate $r_i$ $$\left(\text{or } \frac{q_i + q_{i+1}}{2}\right)$$

and the total sum of the products of the average partial flow rate of the filling cycle $t_i$ and the filling time $t_i$, that is, $\Sigma(r_i \times s_i + q_i \times t_i)$.

In the former method, instead of calculating the amount of milk from assumption, the milk amount can be obtained with minimized error as the partial milk amounts corresponding to each cycle from the beginning of filling until the completion of discharge have been actually measured. In the latter method, measurement with a higher precision can be performed as the average partial flow rate is calculated by averaging the flow rates at two time points in the filling period both before and after the discharge so as to deal with rapid and drastic changes in flow rate during milking operation.

BRIEF DESCRIPTION OF THE DRAWINGS

FIGS. 2 through 6 show the first embodiment wherein FIG. 2 is a cross section and FIGS. 3 and 4 detailed views of a bearing member of a swinging member.

FIGS. 7 through 10 show the second embodiment of the measuring device according to this invention;

FIGS. 11 and 12 concern a conventional method for measuring the milk amount;

FIGS. 13 and 15 relate to the first measuring method according to this invention;

FIGS. 16 and 17 relate to the second measuring method;

FIG. 16 shows a lactating curve of cows in general while

DESCRIPTION OF PREFERRED EMBODIMENTS

The present invention will now be described referring to preferred embodiments shown in FIGS. 2 through 10 and FIGS. 13 through 17 respectively.

Figure 2:
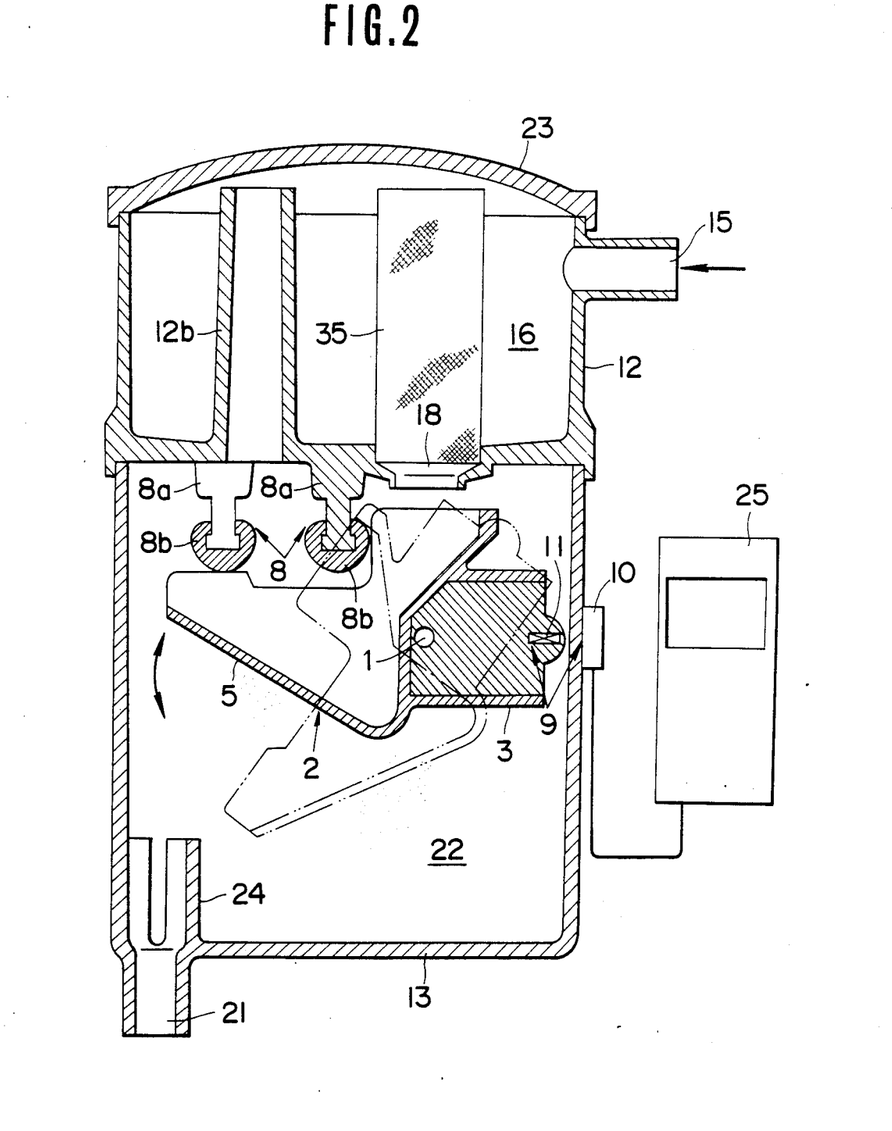

In the drawings, the reference numeral 16 denotes a separating chamber for separating the mixture of milk and air. The separating chamber 16 comprises a container 12 having an inlet port 15 for milk and an outlet port 18 on the bottom and a lid 23 to be capped over the container 12. The reference numeral 35 denotes a strainer to remove impurities such as dust from the milk. A container 13 having an outlet port 21 is mounted below the container 12 in a detachable manner. The container 12 is communicated with a measuring chamber 22 by an air pipe 12b which projects upwardly from the bottom of the container 12. The measuring chamber 22 has a swinging member 2 which is suspended from the lower portion of the container 12 and which is freely rotatable around a shaft 1 in the vertical direction. The swinging member 2 comprises a balance section 3 comprising a weight on one side and a milk tank 5 which is open on the upper portion thereof. The reference numeral 8a denotes a projecting piece on the container 12 and 8b an abutting member of an elastic material such as rubber which is mounted in a detachable manner on the projecting piece 8a and is structured to abut against the swinging member 2 at a predetermined position in revolution thereof so as to function as a stop means restricting the scope of revolution. The reference numeral 11 denotes a permanent magnet for actuating a reed switch 10 provided on a container 13 so that a resilient member 8b comes to position close to the magnet 11 when it abuts against the swinging member 2. The magnet 11 and the reed switch 10 constitute a sensor means 9. The reference numeral 24 denotes a rectifying piece mounted in an outlet port 21 to transform the milk current in the state of mass out of a milk tank 5 into a continuous flow, thereby preventing fluctuation in milking pressure. The reference numeral 25 denotes a computer/display which converts the signals from the sensor means 9 into the figures representing the amount of milk and display them.

Figure 3:
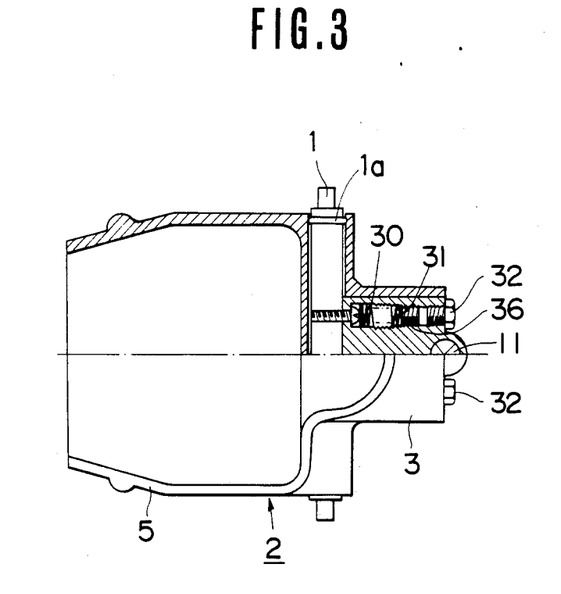
Figure 4:
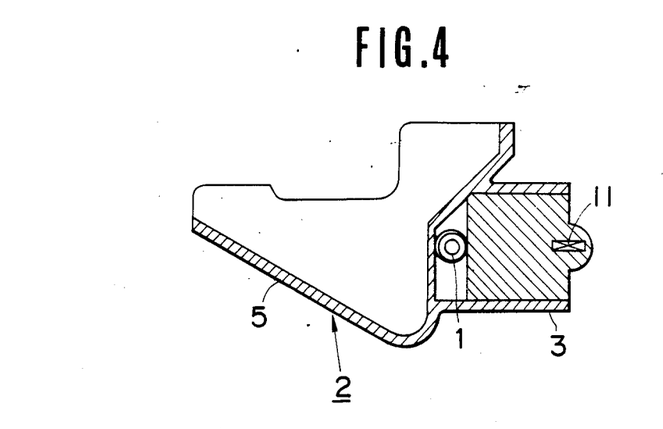

FIGS. 3 and 4 show a swinging member 2 in more detail. A shaft 1 is inserted into the swinging member 2 via an O-ring $1_a$ made of a resilient material such as rubber. The reference numeral 30 denotes blocks of extremely light weight inserted in a plural number into a hole 36 provided on the balancing section. The reference numeral 31 denotes a bolt to press the blocks 30 and 32 another bolt to close the hole.

Figure 5:
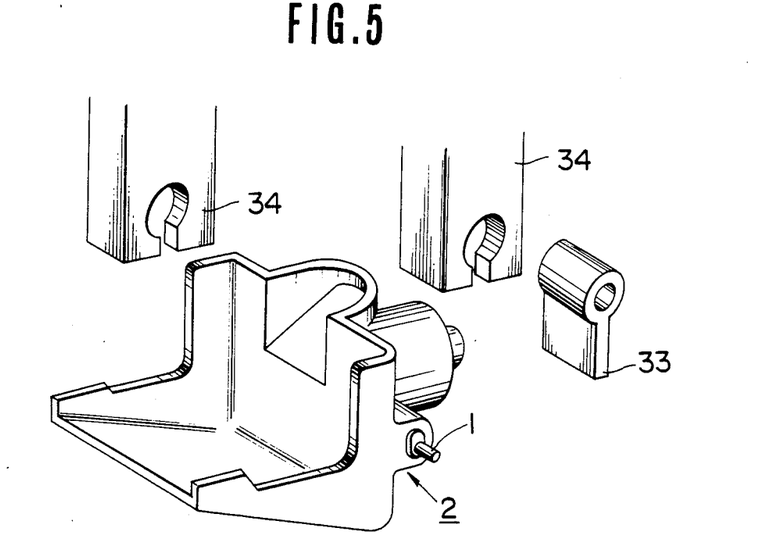
Figure 6:
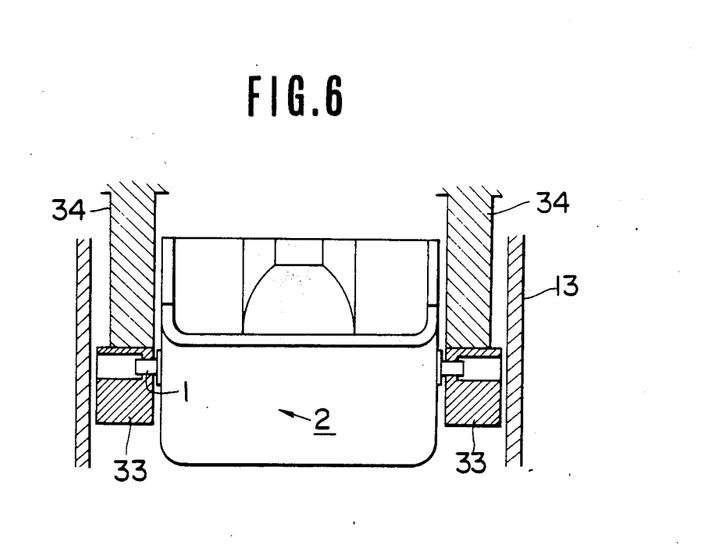

FIGS. 5 and 6 show the bearings of the swinging member 2 in detail. The shaft 1 engages with a bearing 33 which is detachably engaged with a mounting frame 34 suspended from the container 12.

The embodiment of the measuring device mentioned above is operated as below.

The milk extracted by a milking machine flows into a separating chamber 16 from an inlet port 15 via a milk tube (not shown). The air content which has been separated in the separating chamber 16 is guided into a measuring chamber 22 via an air pipe $12b$. The milk separated from the air, on the other hand, flows into and stands in a tank 5 via an outlet port 18. As the milk gradually is accumulated to the extent where the amount of standing milk overcomes the weight of the balance section 3, the balance section 3 rotates upward to discharge the milk. Due to the revolution of the swinging member 2, the milk flowing out of the outlet port 18 is guided downward into the bottom of the measuring chamber 22 directly instead of passing through the tank 5. When the milk is completely discharged from the tank 5, the balance section 3 is made to rotate downward by the weight thereof to make the resilient member $8b$ abut against an end of the swinging member 2 so that milk begins to accumulate in the tank 5 again. Since the quantity of milk which is discharged from the tank 5 and the weight of the balance section 3 are respectively constant, the fluctuation in individual rotations becomes negligible to make the rotation almost constant timewise. The milk, after discharging from the tank 5, is reunited with the air which has been separated, is rectified with a rectifying piece 24, and guided into the milk tube (not shown) via an outlet port 21. The sensor means 9 detects a rotating cycle of the swinging member 2 or the cycle from the time when milk starts filling in the tank till the next start. The partial milk amounts from the outlet port 18 corresponding to respective rotation cycles are calculated in advance as characteristics and the computer/display 25 obtains and displays the partial milk amount which fits the cycle of rotation stored, and obtains the total amount of milk by summing the partial amounts.

According to the first embodiment of this invention, as mentioned above, the measuring device 14 does not require a retaining means (suction of a magnet) which used to be needed in the prior art two-tank structure to retain the position of the device 14 at the time when milk is being filled in a tank. The present invention device enhances the reliability in measurement easily by providing a simple weight without complicated adjustment mechanism. As a plural number of light weight blocks are provided on said balance section, even if the balance is slightly fluctuated due to chronological changes in the bearings and/or the swinging member, that will be adjusted easily by changing the number of blocks.

In the above embodiment the stop means 8 comprises a projection piece $8a$ suspended from the container 12 and a resilient member $8b$. Although the shaft 1 may be formed to double as a stop means, the structure in such a case becomes extremely complicated and as the force applied thereon when the means works as a stop is large, it may be easily broken; therefore, the stop means is preferably positioned at a location apart from the shaft 1.

As the resilient member $8b$ is mounted on the abutting portion of the stop means in a freely detachable manner, the wear and tear of the portion which abuts against the stop means of the swinging member is reduced, thereby conveniently decreasing the fluctuation in balance of the swinging member per se. It is preferable to make the swinging member to have less fluctuation in weight or, in other words, to have a predetermined constant ratio in moments of either sides of the rotational shaft. For instance, plastic molding is preferable. The material thereof is preferable to be superior in abrasion resistance as well as to withstand impulsive loads. The material for the shaft is preferably metals or ceramics. In order to couple the plastic main body with the rotational shaft of different materials, the methods such as ultrasonic insert or insert at the time of molding may be used, but as the stress is produced by the difference in thermal expansion coefficients, they are not very desirable for the long term use. If a metal is used as the material for the sensor, it may be welded in coupling but when slight and delicate fluctuation in weight presents a critical problem, that would not be suitable. Therefore, in this embodiment, a shaft having a high abrasion resistance is inserted in a hole bored in a plastic main body (the swinging member) via an O-shaped ring which is made of a resilient material such as rubber.

As the shaft is inserted into the swinging member via the O-ring, the impact during the rotation is alleviated and is not directly transferred to the shaft, the bearing portion thereof can be protected from abrasion. The plastic main body (the swinging member) is also protected from failures which might be otherwise caused by the difference in thermal expansion coefficients.

Although the sensor means 9 above is constituted with a reed switch 10 and a permanent magnet 11 so as to actuate the reed switch 10 with the magnetic force, the structure thereof is not limited thereto. Any structure is possible so far as it can generate signals at a predetermined position on the swinging member 2 to measure the rotational cycle. As shown in FIGS. 5 and 6, since the bearing which engages with the shaft is freely detachable in this embodiment, it becomes easy to replace bearings when they are worn by the rotation of the member, thereby enabling maintenance of the original performance.

The material of the swinging member is preferably harder than that of bearings so that abrasion between the shaft and the bearings may occur mainly on the side of the bearings.

The second embodiment according to this invention will now be explained referring to FIGS. 7 through 10. Description for the containers 12, 13 will be omitted as they are identical to the ones explained for the first embodiment and a swinging member 2 made of a hollow member and a stop means 8 will be explained below.

Figure 7:
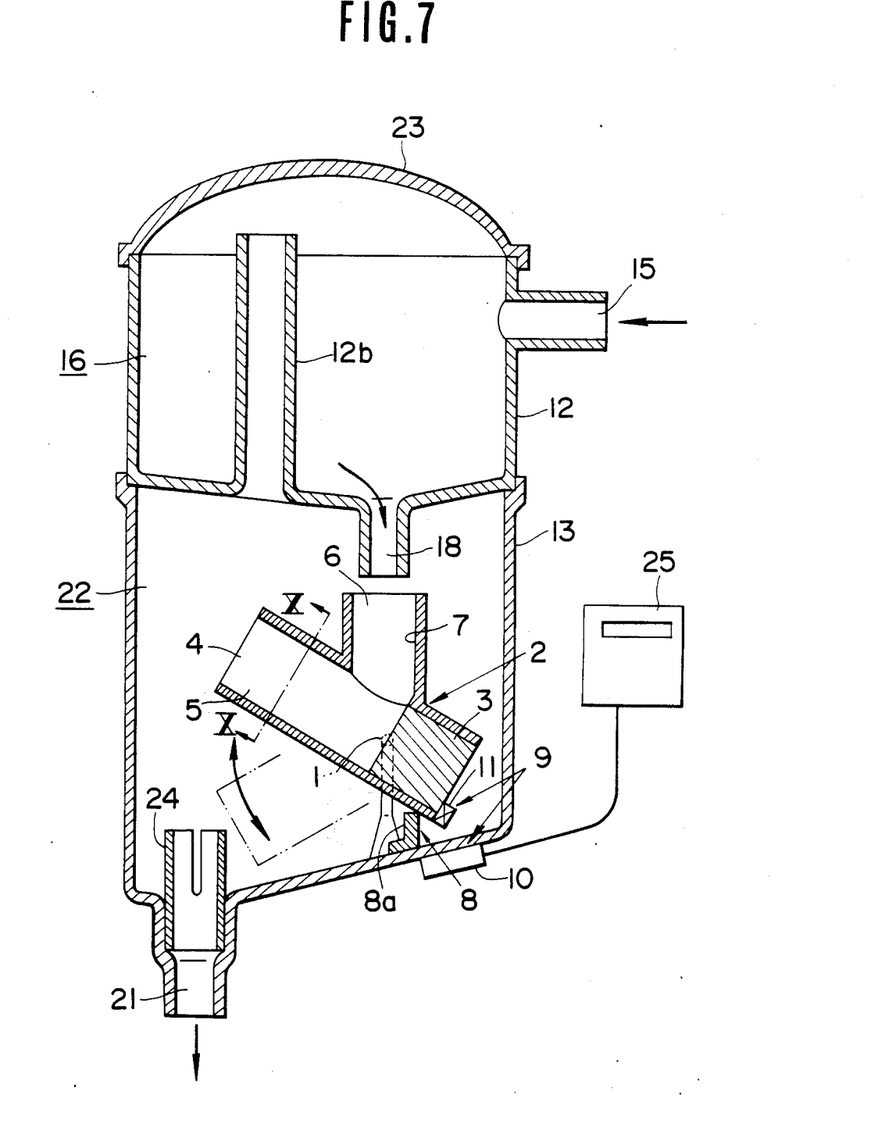
FIG. 7 a cross section.

In a measuring chamber 22, a swinging member 2 of a hollow structure is vertically rotational around the axially extending shaft 1 which is located in the lower portion of the container 13 and which functions as a fulcrum. Said swinging member 2 is partitioned on both sides of the shaft 1 into a balance section 3 comprising a weight and a milk tank 5 having an outlet port 4. On the upper portion of the peripheral wall of the hollow swinging member 2 is provided a milk passage 7 which has a filling port 6 projected upward from the shaft 1 to let milk in and which leads to the tank 5. The reference numeral 8a denotes a projection piece provided on the container 13 which is so structured to abut on an end portion of the balance section 3 at a predetermined rotational position and constitutes a stop means 8 to define the rotational scope of the member 2. When the projection piece 8a abuts against the balance section 3, the filling port 6 is positioned to come directly under the outlet port 18. The reference numeral 11 denotes a permanent magnet which actuates a reed switch 10 provided on the container 13 so as to position the projection piece 8a close to the magnet 11 when it abuts against the balance section 3. The magnet 11 and the reed switch 10 constitute a sensor means 9.

The second embodiment according to this invention having the above mentioned structure is operated as follows.

The milk extracted by a milking machine flows into a separating chamber 16 from an inlet port 15 via a milk tube (not shown) The air content separated in the separating chamber 16 is guided to a measuring chamber 22 through an air pipe 12b. The milk after being separated from the air, on the other hand, flows into the outlet port 18 to stand in the tank 5. When the standing milk increases and reaches a certain quantity to overcome the weight of the balance section 3, the section 3 rotates upward to discharge the milk from the tank 5. The rotation of the swinging member 2 then causes the milk to drop directly onto the bottom of the measuring chamber 22 rather than passing through the tank 5. When the milk has been discharged from the tank 5, the balance section 3 is rotated downward with the weight thereof and the projection piece 8a comes to abut against an end of the balance section to thereby let the milk accumulate again in the tank 5. As the amount of milk discharging from the tank 5 and the weight of the balance section 3 are respectively constant, the fluctuation in the time needed for individual rotations of the swinging member 2 is negligible and the time can be regarded almost constant. The milk discharged from the tank 5 is reunited with the air, rectified by the rectifying piece 24, and guided into a milk tube for supply (not shown) from the outlet port 21. The sensor means 9 measures the rotational cycle of the swinging member 2 or in other words, the cycle from the time starting the milk filling until the next start. Partial milk amounts from the outlet port 18 corresponding to respective rotational cycles are obtained in advance as characteristics, partial milk amount corresponding to measured rotational cycle is obtained from the stored characteristic and displayed by a computer/display 25, and the sum of the partial amounts is calculated as the total milk amount.

As described above, in the second embodiment according to this invention, a swinging member 2 of a hollow structure is provided on the axis or the shaft 1 in a manner vertically rotatable and is divided on either side of the shaft into a balance section 3 having a weight and a milk tank 5 having an outlet port 4. Due to such a structure, the device does not require a special means for retaining the swinging member during filling of the milk which used to be necessary in the prior art two-tank structure nor the complicated adjustment mechanism. The device can also have a higher reliability in measuring precision and can be reduced in size and complexity.

As a milk passage 7 which communicates with the tank 5 is formed on the peripheral wall of the hollow swinging member 2 which has a filling port 6 projecting upward from the shaft 1 to let the milk in, the milk flows axially when it is being filled in the tank 5 to thereby make the swinging member 2 less susceptible to the force of the milk. The influence of the milk flow in the axial direction at the time of discharge on the rotational movement of the swinging member 2 is minimized to attain a higher precision in measurement of rotational cycles. This naturally leads to a higher precision in measuring of milk.

Figure 8:
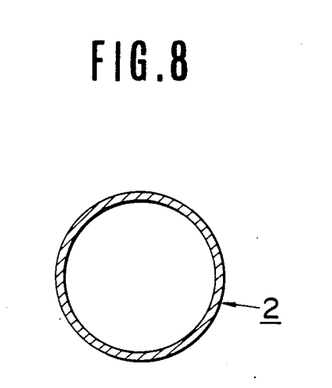
FIGS. 8 and 9 cross sections along the line X—X of FIG. 7.
Figure 9:
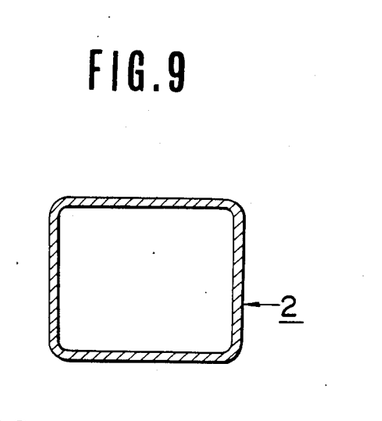

The hollow swinging member 2 in this embodiment may be circular or rectangular in cross section as shown in FIGS. 8 and 9 in order to simplify the molding process as well as to reduce the cost. Any suitable commercial products available in the market may be used.

Figure 10:
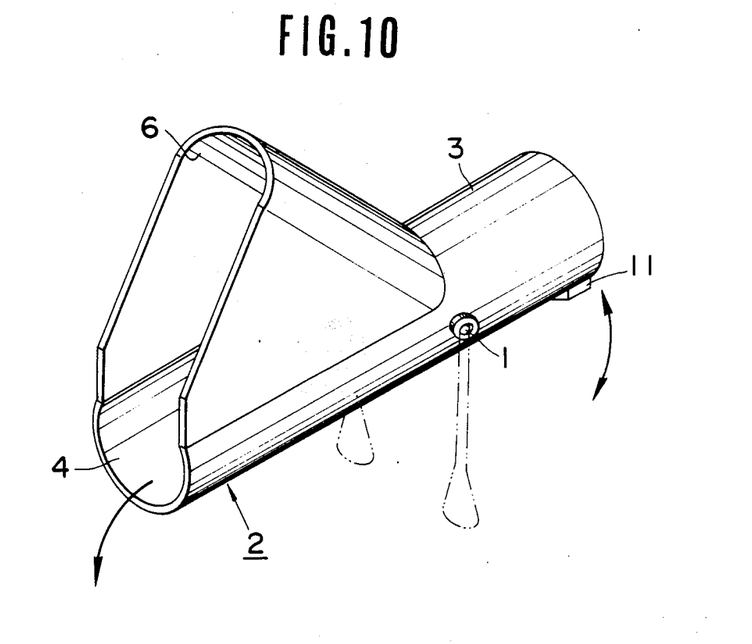
FIG. 10 a perspective view of another embodiment of the measuring means.

As shown in FIG. 10, the outlet port 4 and the filling port 6 of the hollow swinging member 2 may be formed as an integral member by connecting the peripheral walls of the tank 5 and the passage 7. In such a case, the capacity of the tank 5 can be substantially increased, which prevents foam from flowing out even if mixed in the tank 5 and floating on the upper portion of the liquid inside the tank. This also contributes to the higher precision in milk measuring in terms of the time or the rotational cycle for a predetermined milk quantity or weight to be accumulated in the tank 5.

The angle formed between the swinging member 2 and the milk passage 7 is formed in a manner to cross central axes of both members at an acute angle as shown in FIG. 7. As the axis of the hollow member is inclined against the horizontal line so that the outlet port 4 is directed upward at the time of milk filling, the outlet port 4 of the tank 5 may be constructed simply without providing specially for preventing the milk from flowing out.

In this embodiment, a projection piece 8a is provided as a stop means 8 in a manner to abut against an end of the balance section 3 when the axes of the outlet port 18 and the passage 7 become coaxial, but the shaft may be provided with a mechanism as a stop means 8. However, the stop means is preferably provided apart from the shaft 1 as the structure, if doubling as a shaft-and-stop means, becomes complicated and tends to fail because of the large force applied thereon.

Explanation will now be given to the first measuring method according to this invention referring to the embodiment shown in FIGS. 2 through 6 and FIGS. 13 through 15.

Figure 13:
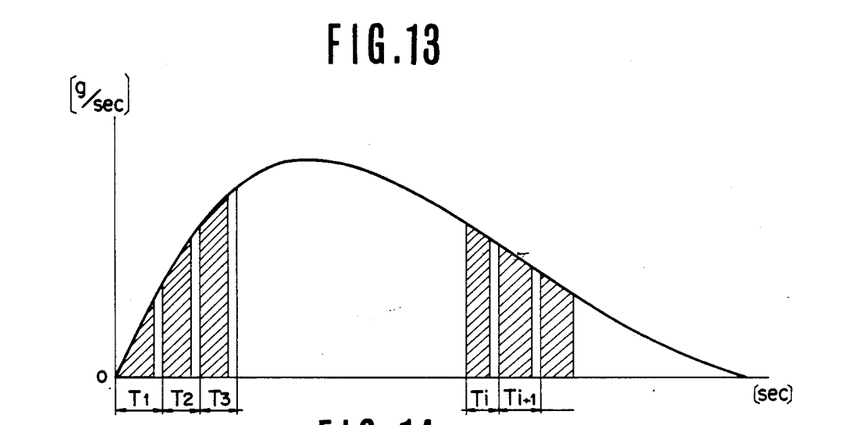
FIG. 13 is a graph of lactating curve of cows in general.
Figure 14:
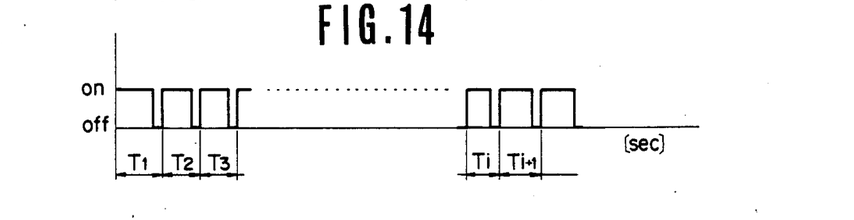
FIG. 14 a diagram of signals of the sensor means and the cycle T.
Figure 15:
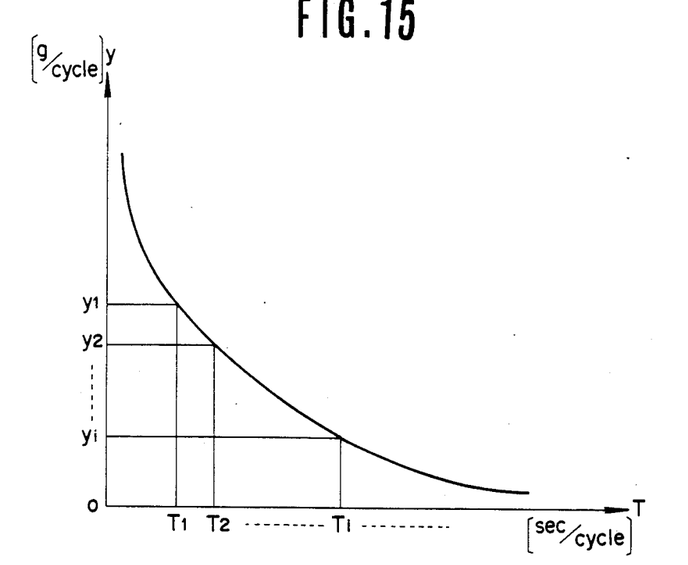
FIG. 15 a y - T characteristic curve graph in the measuring device shown in FIG. 7.

FIG. 13 is a graph showing a lactating curve of general lactating characteristics of cows where the milk flow rate (g/sec.) is plotted on the vertical axis and the time (sec.) on the lateral axis. The hatched portion represents the filling cycle and the remainder the discharging cycle. The area of the hatched portion in the graph represents the weight of the milk which accumulates in a tank for one cycle (g/cycle). One cycle is defined by one filling and discharging movements of the swinging member 2 and the time needed therefor is defined as a rotational cycle T (sec/cycle) which is measured by the sensor means 9. FIG. 14 is a diagram to show the signals from the sensor means 9 and the cycle T. The diagram corresponds to the lactating curve of FIG. 13. The weight of the milk y (g/cycle) which flows from the outlet port 18 into the measuring chamber 22 within a rotational cycle T is detected in advance as y - T characteristic curve. FIG. 15 shows an example of the y - T characteristic curve for the device shown in FIG. 7. The partial milk amounts $y_1, y_2, \ldots y_n$ from the outlet port corresponding to respective cycles $T_1, T_2, \ldots T_n$ which are measured by the sensor means 9 are obtained from the y - T characteristic curve. The total amount Y can be obtained by summing up all the partial amounts as expressed by the equation below, $$Y = y_1 + y_2 + \ldots + y_n = \sum_{i=1}^{n} y_i$$

According to the first measuring method, errors in measurement can be minimized.

Although the device shown in FIG. 7 is used as an example to show the method of measuring milk weight in the first invention method, the present invention by no means is limited to the weight measurement but may be extended to the volume measurement.

The second measuring method will now be described in detail referring to the device shown in FIG. 7 and FIGS. 16 and 17.

Figure 16:
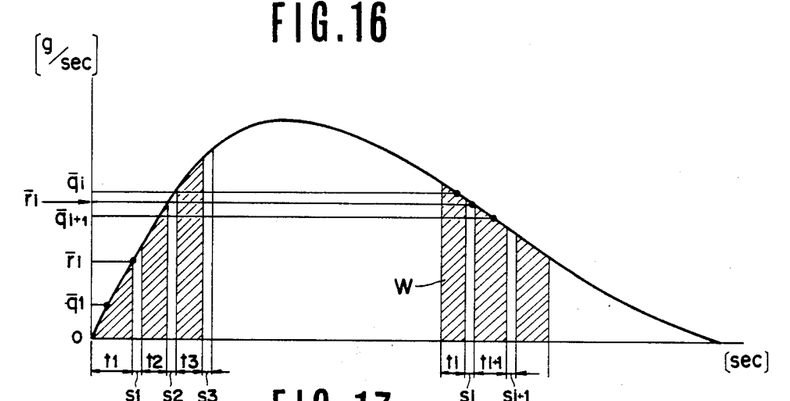
Figure 17:
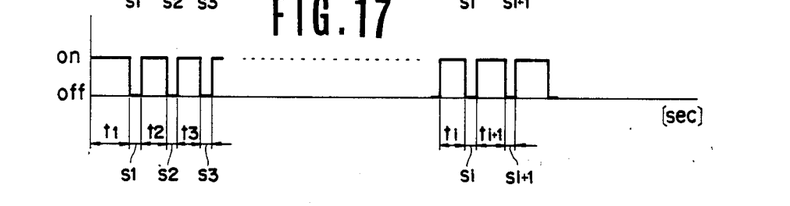
FIG. 17 is a diagram of the relation between the signals and the filling/discharging time of the sensor means.

FIG. 16 shows a lactating curve similar to FIG. 13 wherein the hatched portion represents the filling time in the tank 5 (sec./cycle) $t_1, t_2 \ldots t_n$ while the letters $s_1, s_2, \ldots s_n$ the discharging the (sec./cycle). The area of the hatched portion W represents the weight of milk accumulated in the tank 5 which is always constant FIG. 17 is a diagram which shows the signals from the sensor means 9 and the filling and the discharging times t. and s. The portion circumscribed by the lateral axis and the curve represents the total milk amount in FIG. 16. The partial milk amount at the filling time is equivalent to the weight of milk W for one cycle (g/cycle) of the tank 5 and is constant. The partial milk amount at the discharging time can be obtained by calculating average partial flow rates at two points in the filling time immediately before and after the discharge, obtaining an arithmetic mean of the two, and then calculating an average partial flow rate from the mean. The average partial flow rates $\bar{q}_i$ and $\bar{q}_{i+1}$ (g/sec.) at the filling times $t_i$ and $t_{i+1}$ is expressed as below.

$$\bar{q}_i = \frac{W}{t_i} \quad \bar{q}_{i+1} = \frac{W}{t_{i+1}}$$

If it is assumed that the average partial flow rate $r_i$ at a discharging cycle $s_i$ between the two time points in the filling cycle $t_i$ and $t_{i+1}$ is expressed by the equation, $$r_i = \frac{\bar{q}_i + \bar{q}_{i+1}}{2} = \frac{W}{2} \left( \frac{1}{t_i} + \frac{1}{t_{i+1}} \right)$$

the total sum of the milk can be obtained by measurement for n times as shown below.

$$Y = \sum_{i=1}^{n} (\bar{q}_i \times t_i + \bar{r}_i \times s_i) = \sum_{i=1}^{n} \bar{q}_i \times t_i + \sum_{i=1}^{n} \bar{r}_i \times s_i$$

$$= nW + \sum_{i=1}^{n} \frac{W}{2} \times \left( \frac{1}{t_i} + \frac{1}{t_{i+1}} \right) \times s_i$$

$$= W \times \left\{ n + \frac{1}{2} \sum_{i=1}^{n} \left( \frac{1}{t_i} + \frac{1}{t_{i+1}} \right) \times s_i \right\}$$

As described in the foregoing, arithmetic means are obtained from the partial flow rates at two time points immediately before and after the discharge in the filling cycle in this method and, therefore, compared with the prior art method where an average partial flow rate at only one filling time point is used, the method can readily cope with a sudden change in the flow rate during the milking operation to attain a higher precision in measurement.

INDUSTRIAL APPLICABILITY OF THE INVENTION

As described in the foregoing, as the measuring device and the method therefor enable highly precise measurement, it is applicable to the systems or the apparatuses which detect the end of milking operation by detecting the decrease in the milk amount. The device is also applicable to general devices for measuring the flow rate other than in milking machines.

We claim:

1. A milk amount measuring device for milking machines comprising a measuring chamber (22) having an upper end and a lower end, a port for continuously supplying milk into the upper end of the measuring chamber, a horizontal shaft located within the measuring chamber intermediate the upper and lower ends thereof, a swinging member (2) mounted on said shaft for rotation in the vertical direction around said shaft and including a milk tank, said swinging member being displaceable rotationally about said shaft between a first position for receiving milk in said milk tank from said port and a second position discharging the milk from said milk tank, said swinging member also comprises a balance section (3) having a weight located on one side of said shaft and said milk tank (5) located on the opposite side of said shaft, said milk tank being open at the upper portion thereof, stop means (8) located within said measuring chamber and located in the path of said swinging member to define the position of said swinging member in the first position thereof, and a sensor means (9) for detecting the rotational cycles of said swinging member (2) between the first and second positions thereof.

2. The milk amount measuring device for milking machines as claimed in claim 1 wherein plural blocks 30 of small weight are mounted inside said balance section 3 in a detachable manner.

3. The milk amount measuring device for milking machines as claimed in claim 1 wherein a second stop means 8 abutting on said swinging member 2 is mounted in a detachable manner with a resilient member 8b such as rubber for defining the second position thereof.

4. The milk amount measuring device for milking machines as claimed in claim 1 wherein said shaft extends through said swinging member (2) with an O-shaped ring of a resilient material such as rubber mounted in said swinging member and encircling said shaft for supporting said shaft from said swinging member.

5. The milk amount measuring device for milking machines as claimed in claim 1 wherein said swinging member 2 comprises a hollow member which is partitioned on both sides of the shaft 1 into said balance section 3 comprising a weight on one side and said milk tank 5 haivng an outlet port 4 on the other side, and a milk passage 7 which projects upwardly from the shaft 1 in the first position of said swinging member, a filling port 6 on the upper end thereof in the first position of said swinging member for letting milk in, and said milk passage communicates with said milk tank 5.

6. The milk amount measuring device for milking machines as claimed in claim 5 wherein the swinging member 2 comprising said hollow member is circular in cross section.

7. The milk amount measuring device for milking machines as claimed in claim 5 wherein the swinging member (2) comprising said hollow member is rectangular in cross-section.

8. The milk amount measuring device for milking machines as claimed in claim 5 or 6 wherein said milk tank 5 and said milk passage 7 have peripheral walls connected as an integral structure in communication with said outlet port 4 and said filling port 6.

9. The milk amount measuring device for milking machines as claimed in claim 5 or 6 wherein said milk passage 7 and said swinging member 2 each have a central axis which cross each other at an acute angle.

10. The milk amount measuring device for milking machines as claimed in claim 5 or 6 wherein a projecting piece 8a abutting against an end of said balance section 3 is formed as said stop means in a manner to make the axes of said milk supplying port 18 and of said milk passage 7 coaxial.

11. The milk amount measuring device for milking machines as claimed in any one of the claims 1 through 5 wherein said sensor means 9 is formed by combination of a reed switch 10 and a permanent magnet 11.

* * * * *